United States Patent [19]
Kulkarni et al.

[11] Patent Number: 5,498,007
[45] Date of Patent: Mar. 12, 1996

[54] DOUBLE GAS BARRIER SEAL

[75] Inventors: Sunil B. Kulkarni, Portage; Randy R. Dingman, Schoolcraft, both of Mich.

[73] Assignee: Durametallic Corporation, Kalamazoo, Mich.

[21] Appl. No.: 189,794

[22] Filed: Feb. 1, 1994

[51] Int. Cl.[6] ..................................................... F16J 15/34
[52] U.S. Cl. ........................................... 277/96.1; 277/65
[58] Field of Search ............................. 277/27, 65, 81 R, 277/96, 96.1

[56] References Cited

U.S. PATENT DOCUMENTS

| | | | |
|---|---|---|---|
| 3,638,957 | 2/1972 | Marsi | 277/96.1 |
| 3,675,935 | 7/1972 | Ludwig et al. | 277/27 |
| 3,704,019 | 11/1972 | McHugh | 277/96.1 X |
| 3,744,805 | 7/1973 | Heinrich | 277/96.1 |
| 3,767,212 | 10/1973 | Ludwig | 277/27 X |
| 3,804,424 | 4/1974 | Gardner | 277/27 |
| 3,894,741 | 7/1975 | McHugh | 277/27 |
| 4,290,611 | 9/1981 | Sedy | 277/27 |
| 4,420,162 | 12/1983 | Yanai et al. | 277/96.1 |
| 4,423,879 | 1/1984 | Takenaka et al. | 277/96.1 |
| 4,972,986 | 11/1990 | Lipschitz | 277/27 X |
| 5,039,113 | 8/1991 | Gardner | 277/96.1 X |
| 5,090,712 | 2/1992 | Pecht et al. | 277/96.1 |
| 5,201,531 | 4/1993 | Lai | 277/96.1 |
| 5,222,743 | 6/1993 | Goldswain et al. | 277/96.1 |
| 5,375,853 | 12/1994 | Wasser et al. | 277/59 |

FOREIGN PATENT DOCUMENTS

| | | | |
|---|---|---|---|
| 2113173 | 4/1990 | Japan | 277/96.1 |
| 1753133 | 8/1992 | U.S.S.R. | 277/96.1 |

OTHER PUBLICATIONS

John Crane "Type 2800 Non–Contacting, Dry–Running Double Cartridge Seal", John Crane International, ©1993, 6 pages.
Borg–Warner "Type GS Mechanical Seal, For Liquid or Gas Service", Borg–Warner Corporation, ©1973, 7 pages.
"John Crane Type 28 Series Dry–Running Gas Seals" brochure (16 pages), John Crane International, 1989.
Pacific "Intelligent Sealing for One and All", Pacific Wietz GmbH & Co. KG, Germany, 1990.

Primary Examiner—William A. Cuchlinski, Jr.
Assistant Examiner—John L. Beres
Attorney, Agent, or Firm—Flynn, Thiel, Boutell & Tanis

[57] ABSTRACT

A mechanical seal assembly having a deep groove pattern formed in the face of the rotating seal ring, which groove pattern includes two sets of straight angled deep grooves, the sets being angled in opposite rotational directions to provide pumping of barrier gas into the grooves irrespective of the direction of rotation. The groove pattern also includes a deep annular groove formed in the seal face and communicating with radially inner ends of the angled grooves to facilitate flow of barrier gas into and through the grooves to improve cooling of the seal faces and minimization of contact pressure between the seal faces.

19 Claims, 3 Drawing Sheets

DOUBLE GAS BARRIER SEAL

FIELD OF THE INVENTION

This invention relates to a mechanical seal having an improved hydrostatic groove pattern formed in one of the seal faces to provide for improved cooling and balancing of the seal assembly and, in particular, the incorporation of the mechanical seal assembly into a gas barrier type double seal arrangement.

BACKGROUND OF THE INVENTION

Double dry-running gas barrier seal arrangements are currently known and are utilized in various industrial applications, particularly chemical and petrochemical applications, so as to reduce the level of emissions leakage. In the typical double gas barrier seal arrangement, inner and outer mechanical seal assemblies are positioned in axially spaced relationship relative to a rotatable shaft, such as a pump shaft, with the seal assemblies coacting between the shaft and the surrounding housing to create a seal between opposed relatively rotatable annular seal faces as defined on the rotor and stator of the respective seal assemblies. An inert gas, such as air or nitrogen, is typically supplied into a barrier chamber defined between the two seal assemblies, with the barrier gas typically being at a pressure greater than the product pressure, to prevent product leakage. Any leakage across the inner seal assembly thus results in the gas entering the product, and any leakage across the outer seal assembly results in acceptable emission of air or nitrogen into the environment.

In one known double seal arrangement of the type explained above, specifically an arrangement manufactured by John Crane, the inner and outer seal assemblies are provided with spiral groove patterns provided on the rotors of both seal assemblies. The groove pattern is exposed to the barrier gas and functions to pump the barrier gas toward the ungrooved portion of the seal face so that a compressed gas cushion is formed which serves as a sealing dam to prevent escape of product being sealed. By providing a grooved seal face which receives barrier gas therein, this is also believed to reduce face contact pressure and hence reduce face heat generation and friction.

Another known seal assembly which provides a grooved face exposed to a barrier gas is manufactured by Borg-Warner, and includes radially directed deep grooves which at one end communicate with the barrier gas and at the other end communicate with a small annular groove, the latter in turn surrounding a nongrooved annular portion of the seal face which functions as a barrier or dam.

While seal assemblies of the type described above utilizing both spiral grooves and radial grooves have been known and utilized for a significant period of time, and while these seal assemblies are effective for minimizing product leakage while at the same time reducing frictional contact pressures between the seal faces and hence minimizing frictional forces, heat generation and face wear, nevertheless it is believed that these operating conditions can be still further improved by improving the configuration of the groove pattern formed on the seal face.

For example, it is desired to provide an improved deep groove pattern which is effective for maximizing the supply of barrier gas into the grooves for deposition between the opposed seal faces to minimize the contact pressure and hence reduce friction and wear and temperature, and at the same time provide a groove pattern which can effectively accomplish this function irrespective of seal ring rotation, namely by providing an improved groove pattern which is effectively bi-directional. While the groove pattern of the Borg-Warner seal described above is bi-directional, nevertheless the radial orientation of the grooves prevents them from creating any significant pumping effect with respect to forcing gas into the grooves, and the radial grooves are effective only for low pressure differentials between the product (or environment) and barrier gas. While the spiral grooves of the John Crane seal do provide a pumping effect in one rotational direction, they are highly ineffective in the other rotational direction. Also, these spiral grooves are typically shallow and hence operate on a different principle, namely on a hydrodynamic layer which is effective only at higher rotational speeds.

Accordingly, it is an object of this invention to provide an improved mechanical seal assembly having a deep groove pattern on the rotating seal face, which groove pattern communicates with a barrier gas to provide a highly improved degree of performance, particularly improved performance at high differential pressures and in either rotational direction, and which overcomes and improves upon the performance of prior seal assemblies of this general type.

More specifically, this invention relates to an improved mechanical seal assembly having a deep groove pattern formed in the face of the rotating seal ring, which groove pattern includes two sets of straight angled grooves, one set being angled in one rotational direction, the other set being angled in the opposite rotational direction, to provide effective pumping of barrier gas into the grooves irrespective of the direction of rotation, and to provide improved hydrostatic performance to reduce contact pressure between the seal faces even at high pressure differentials between the product/environment and barrier gas.

In the improved seal assembly of this invention, the groove pattern preferably also includes a deep annular groove which is formed in the seal face and communicates with the radially inner ends of the angled grooves to facilitate flow of barrier gas into and through the grooves to greatly improve the cooling of the seal faces and the minimization of contact pressure between the seal faces. This overall groove pattern also results in formation of several face pads which are disposed in series along the dam, with each pad being defined circumferentially between two angled grooves and radially outwardly of the annular groove. These pads act as bearing supports to reduce the overall unit loading between the seal faces, and also develop a slight lift due to thermal waviness so as to reduce unit loading across the seal faces. The overall groove pattern, and specifically the manner in which the angled grooves communicate with the annular groove, facilitate the removal of wear debris from between the seal faces. In addition, the angled grooves force the barrier gas down into the annular groove, irrespective of the direction of rotation, which annular groove creates a hydrostatic pressure dam in complete surrounding relationship to the seal face dam so as to minimize contact pressure or unit load on the face dam, and at the same time prevent leakage of product across the face dam due to the pressure of the barrier gas being higher.

Other objects and purposes of the invention will be apparent to persons familiar with structures of this general type upon reading the following specification and inspecting the accompanying drawings.

Figure 1:
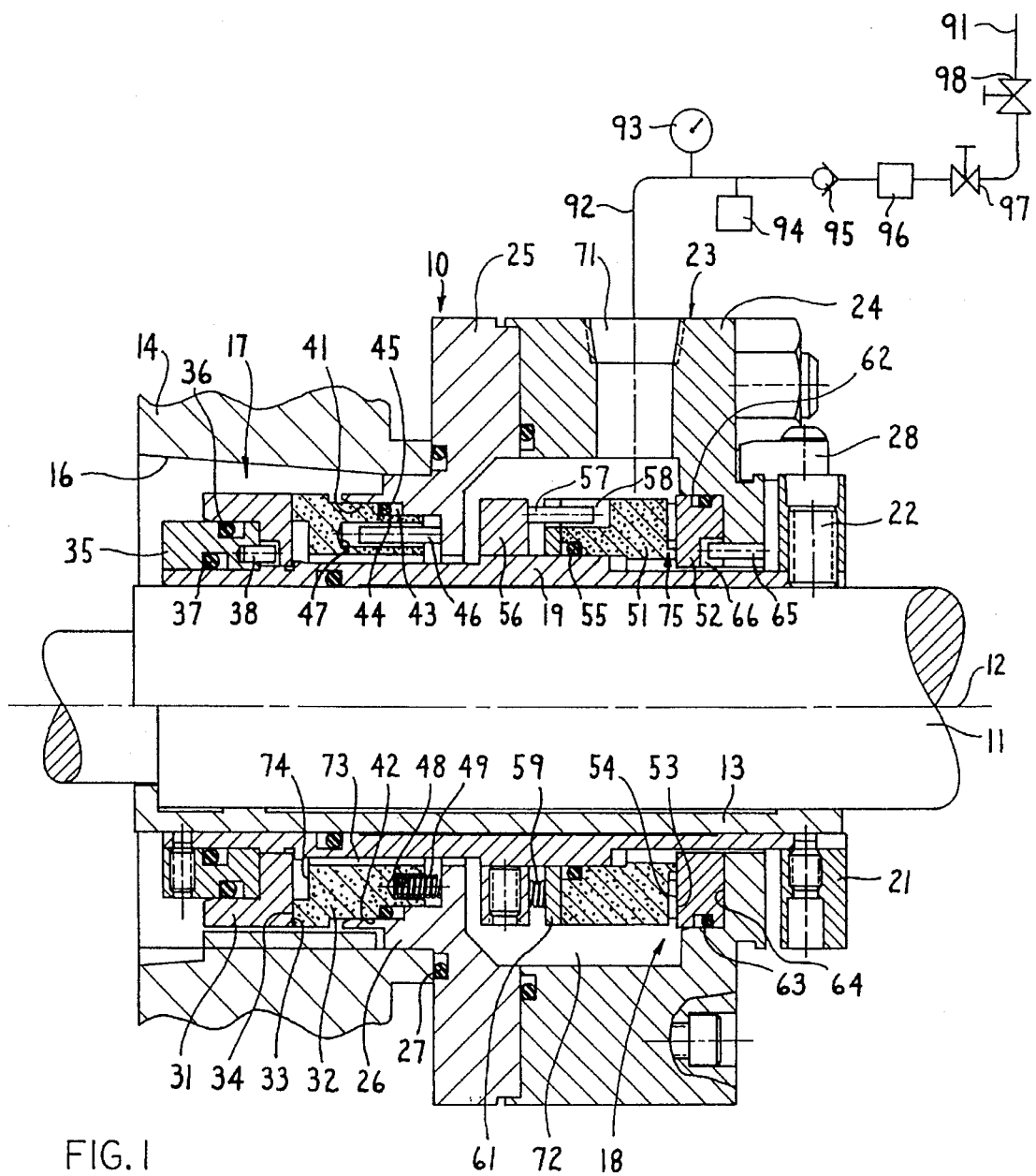
FIG. 1 is a central sectional view of a gas barrier double seal arrangement according to one embodiment of the present invention.

Certain terminology will be used in the following description for convenience in reference only, and will not be limiting. For example, the words "upwardly", "downwardly", "rightwardly" and "leftwardly" will refer to directions in the drawings to which reference is made. The word "inner" will refer to the end of the seal arrangement disposed more closely adjacent the part of the equipment in which product is being sealed, this being the leftward end in FIGS. 1 and 4, and the word "outer" will refer to the end of the seal arrangement remote from the product being sealed, this being the rightward end in FIGS. 1 and 4. The words "inwardly" and "outwardly" will refer to directions toward and away from, respectively, the geometric center of the assembly and designated parts thereof. Said terminology will include the words specifically mentioned, derivatives thereof, and words of similar import.

DETAILED DESCRIPTION

Referring to FIG. 1, there is illustrated a preferred embodiment of a gas barrier double seal arrangement 10 according to the present invention. This double seal arrangement 10 is disposed in concentric relationship to an elongate shaft 11 which is rotatable about its axis 12 and which, in the illustrated embodiment, is provided with a surrounding shaft sleeve 13 nonrotatably secured thereto. The double seal arrangement cooperates with a chamber or stuffing box 16 associated with a housing 14 of the equipment from which the shaft 11 protrudes, such as a pump.

The gas barrier double seal arrangement 10 includes an inner seal assembly 17 which is positioned more closely adjacent the product being handled, such as the pumping chamber, and an outer seal assembly 18 which is disposed outwardly of but axially in series with the inner seal assembly 17. These seal assemblies 17 and 18, in the illustrated embodiment, are concentrically mounted on an elongate sleeve 19, such as adjacent opposite ends thereof, which sleeve 19 concentrically surrounds and is nonrotatably fixed relative to the shaft 11. A securing ring 21 is mounted on the sleeve 19 adjacent the outer end thereof, and is provided with a set screw 22 for securement to the shaft.

The double seal arrangement 10 projects partially into the chamber 16, with the outer portion of the seal arrangement 10 being disposed within and surrounded by a gland or housing part 23 which, in the illustrated embodiment, is defined by a pair of gland rings 24 and 25 which axially and sealingly abut one another. The rings 24 and 25 are axially secured together and fixedly and sealingly positioned relative to the housing 14. The inner gland ring 25 has an annular hub part 26 which telescopes into the outer end of chamber 16 so as to be positioned in surrounding relationship to the inner seal assembly 17. An O-ring 27 cooperates between the housing 14 and gland ring 25 for creating a sealed relationship therebetween. A plurality of centering clamps 28 are mounted circumferentially around the securing ring 21 and clampingly engage an annular hub portion defined at the outer end of the gland ring 24.

Referring now to the inner seal assembly 17, it includes a rotating seal ring (a rotor) 31 and a stationary seal ring (a stator) 32 which substantially concentrically surround the shaft and respectively define thereon flat annular seal faces 33 and 34 maintained in abutting relative rotatable sliding contact with one another to create a seal between the regions disposed radially inwardly and outwardly thereof. A collar 35 externally surrounds and is nonrotatably secured to the shaft sleeve 19, and is sealingly engaged with a rearwardly projecting annular hub portion of the rotor 31 through an intermediate elastomeric seal ring 36. A similar elastomeric seal ring 37 cooperates between the collar 35 and the shaft sleeve 19. One or more drive pins 38 are fixed to the collar 35 in angularly spaced relationship therearound, and project axially therefrom into recesses formed in the rotor 31 so as to nonrotatably connect the rotor 31 to the collar 35.

As to the stator 32, it has a stepped exterior cylindrical wall 42 which is axially slidably accommodated within a similar interior wall defined by a stepped bore 41 formed in the annular hub part 26 of the gland ring 25. These opposed stepped walls define an annular chamber 43 therebetween in which an elastomeric seal ring 44 is accommodated to create a sealed relationship between the stator 32 and the gland ring 25. This seal ring 44 is normally sealingly engaged against a rear wall 45 of the rotor 31 when the region between the inner and outer seal assemblies 17 and 18 is provided with a higher pressure barrier gas therein, as explained hereinafter.

The annular hub part 26 has one or more pins 46 fixed thereto at angularly spaced intervals, which pins 46 project axially into recesses 47 which open axially inwardly of the stator 32 so as to nonrotatably couple the stator 32 to the gland ring 25. Further recesses 48 are formed axially inwardly from the outer end of stator 32 in circumferentially spaced relationship, and these recesses 48 accommodate therein springs 49 which react between the stator 32 and the gland ring 25 so as to always resiliently bias the stator 32 axially toward the rotor 31 to maintain contact between the seal faces 33 and 34.

The outer seal assembly 18 is of similar construction in that it includes a rotating seal ring (a rotor) 51 and a stationary seal ring (a stator) 52 which respectively have flat annular seal faces 53 and 54 maintained in relatively rotatable sliding contact with one another to maintain a seal between the regions disposed radially inwardly and outwardly thereof. The rotor 51 externally surrounds and is sealingly engaged relative to the shaft sleeve 19 through an elastomeric seal ring 55 disposed therebetween. A collar 56 surrounds and is fixedly secured to the shaft sleeve 19 and has one or more circumferentially-spaced drive pins 57 fixed thereto. These pins 57 in turn project into recesses 58 formed in the rotor 51 to nonrotatably couple the rotor to the shaft. A plurality of circumferentially-spaced springs 59 are accommodated in recesses (not shown) in the rotor 51, and axially coact between the rotor 51 and the collar 56 so as to normally resiliently urge the rotor 51 axially outwardly toward the stator 52 to maintain contact between the seal faces 53 and 54. A retainer plate 61 is secured to the end of the rotor to retain the springs 59 and seal ring 51 in proper positional relationship.

The stator 52 is stationarily positioned within an annular recess 62 defined within the gland ring 24, with an elastomeric seal ring 63 coacting therebetween for creating a sealed relationship. The stator 52 normally abuts a rear wall 64 of the recess. A plurality of pins 65 are secured to the gland ring 24 and project axially therefrom into recesses 66 formed in the stator 52 for nonrotatably securing the stator 52 relative to the gland ring 24.

The gland 23 has an opening 71 formed radially therethrough for communication with an annular chamber 72 which is defined interiorly of the gland in surrounding relationship to at least a part of the double seal arrangement 10. This annular chamber 72, which is the barrier gas chamber as explained below, surrounds the outer seal assembly 18 and also includes an annular chamber portion 73 which is internally of and partially externally of the stator 32 associated with the inner seal assembly 17. In this respect, the stator 32 has a recessed front wall 74 which communicates with the subchamber 73 so as to permit barrier gas to access and contact this front face 74 to provide for desired balancing of barrier gas pressure on opposite ends of the stator 32 so as to control the contact pressure between the seal faces 33 and 34. In this respect, it should be noted that the outer diameter of the recessed face 74 is only slightly smaller than the rear face diameter of the stator 32 as defined by contact of the seal ring 44 with the wall 41, whereby the pressurized barrier gas imposes only a minimal unbalanced force on the stator 32 urging it into contact with the rotor 31.

To control the contact pressure between the seal faces 53 and 54 of the outer seal assembly 18, and to simultaneously extract heat from the seal face area, the seal face 53 of rotor 51 is provided with a groove arrangement 75 formed therein and disposed in continuous communication with the chamber 72 so as to provide continuous communication with the barrier gas.

Figure 2:
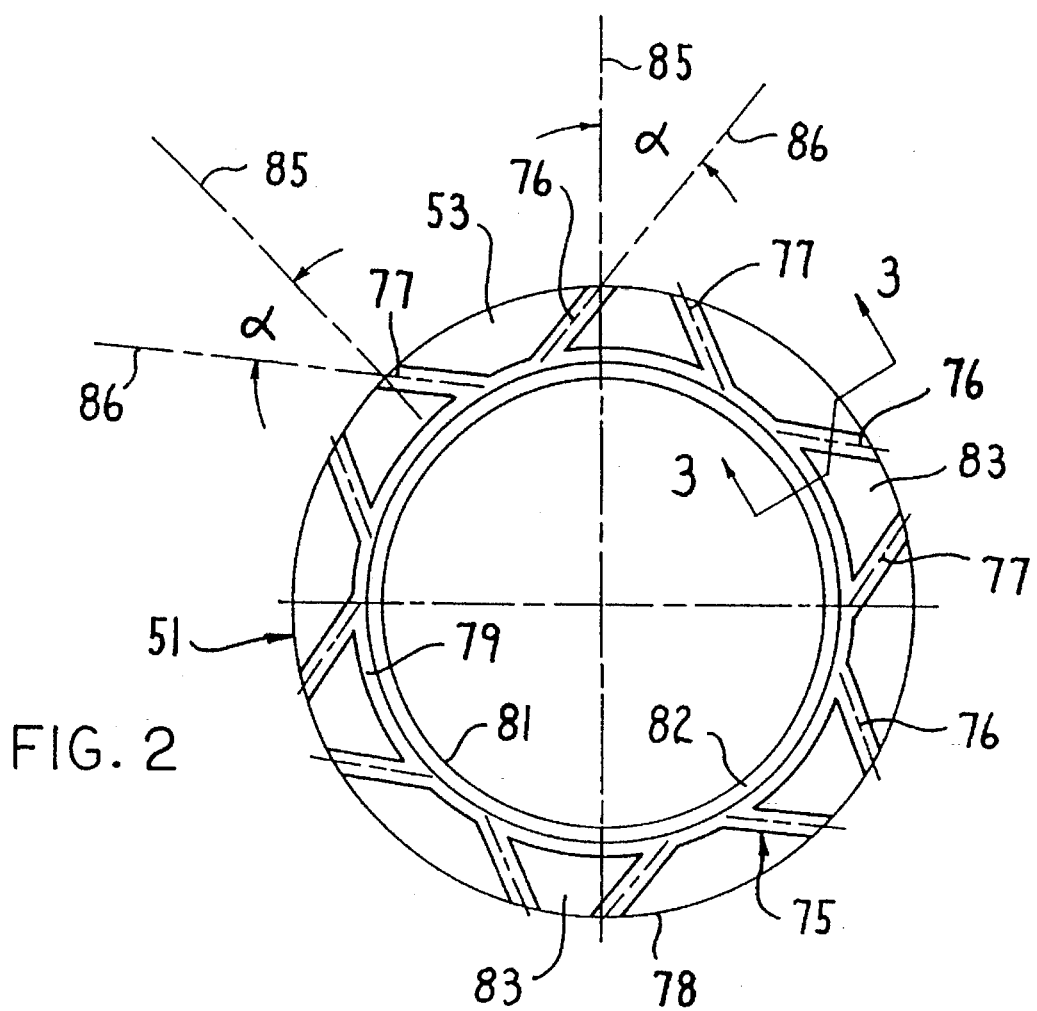
FIG. 2 illustrates the grooved face of the rotor associated with the outer seal assembly of FIG. 1.
Figure 3:
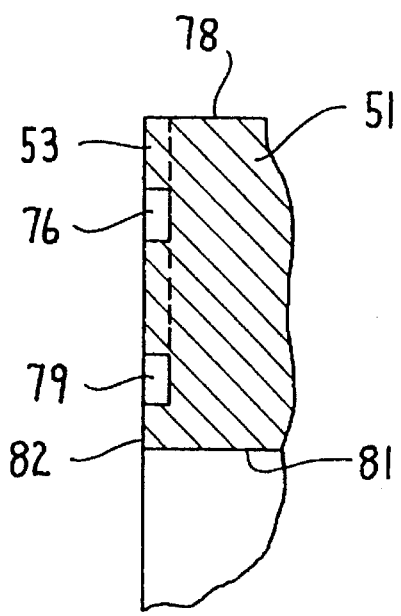
FIG. 3 is an enlarged fragmentary sectional view taken substantially along line 3—3 in FIG. 2.

Referring to FIGS. 2 and 3, the groove arrangement 75 includes a first set of straight grooves 76 which communicate with the outer peripheral wall 78 of the seal face and which project radially inwardly in angled relationship relative to a radial direction. For example, the centerline 86 of the straight groove 76 projects radially inwardly at an acute angle α relative to a radial direction 85 at the point of intersection as defined at the outer periphery of the seal face 53. The individual angled straight grooves 76 are uniformly angularly spaced around the seal face, there being six such grooves in the illustrated embodiment.

The groove arrangement 75 includes a second set of straight grooves 77 which are substantially identical to the first grooves 76 except that the second grooves 77 are reversely angled relative to the respective radial direction 85. With this arrangement, each second groove 77 is disposed circumferentially between two first grooves 76, and similarly each first groove 76 is circumferentially disposed between two adjacent second grooves 77.

All of the straight grooves 76 and 77 project radially inwardly and terminate at inner ends which are in open communication with an annular groove 79 which is formed in and extends concentrically of the seal face 53. The annular groove 79 is disposed radially outwardly from the inner diameter 81 of the face 53, whereby there is defined an annular seal face portion or dam 82 which is defined between the inner diameter 81 and the annular groove 79. This annular face portion or dam 82 is a flat annular surface which is free of grooves, and is maintained in relatively rotatable sliding contact with the opposed seal face 54.

The straight grooves 76 and 77 and the annular groove 79 cause the seal face 53 to be divided into a plurality of generally trapezoidal-shaped face pads 83, with a plurality of such face pads 83 being disposed in circumferentially surrounding relationship to the annular dam 82.

All of the grooves 76, 77 and 79 which make up the groove arrangement 75 preferably have both a width and a depth which is relatively large so as to permit free access of barrier gas into these grooves for development of a hydrostatic pressure within the grooves, which hydrostatic pressure acts against the opposed seal face 54 to control the contact pressure or load between the seal faces 53 and 54. In the illustrated embodiment, the grooves 76, 77 and 79 all normally and preferably have the same depth, which depth may range from about 0.04 to about 0.08 inch, and preferably is about 0.06 inch. The angled grooves 76 and 77 normally have a width which is greater than the width of the annular groove 79, typically being about twice as wide. In the preferred embodiment, the angled grooves 76 and 77 have a width in the range of about 0.09 to about 0.13 inch, preferably about 0.11 inch, and the annular groove 79 has a width in the range of about 0.04 to about 0.08 inch, and preferably about 0.06 inch. The inclination of the angled grooves 76 and 77, as indicated by the angle α in FIG. 2, normally is in the range of about 30 to about 60 degrees, with the angle α preferably being about 40 degrees.

As to the position of the annular groove 79 relative to the radially inner and outer diameters of the seal face 53, this position is preferably selected such that the dam 82 has a radial width no more than about 25% of the overall radial width of the seal face 53, with the radial width of the dam 82 preferably being in the range of about 15% to about 20% of the radial width of the seal face 53 as measured between the inner and outer diameters 81 and 78 respectively.

The seal rotor 51 and stator 32 are normally constructed of a carbon composition, whereas the stator 52 and rotor 31 are normally constructed of a harder material such as tungsten carbide.

To supply a pressurized barrier gas such as air or nitrogen to the chamber 72, the inlet opening 71 is normally coupled to a supply line 92, the inlet 91 of which is coupled to a conventional source of an inert pressurized barrier gas. This supply line 92 contains many of the usual flow control elements associated therewith which, in the embodiment illustrated by FIG. 1, include a pressure gauge or indicator 93, a low pressure indicator or alarm 94, a one-way check valve 95, a flow meter 96, a metering valve 97, and a pressure regulator 98.

In operation, the inert pressurized barrier gas is supplied through line 92 into the annular chamber 72, with the barrier gas being at a pressure up to about 200 psi. The pressure of the barrier gas is greater than the pressure of the product within the stuffing box chamber 16, which product pressure is being sealed by the inner annular seal assembly 17. In fact, the pressure differential across the outer seal can be as great as 200 psi since this outer seal cooperates with the environment. The barrier gas also occupies the annular subchamber 73 to act against portions of both the axial rear and front faces of the rotor 31 to maintain a significant degree of pressure balance thereon to prevent excessive contact pressure between the seal faces 33 and 34. The pressurized barrier gas also enters into the chamber 43 and acts against the seal ring 44 so as to urge the latter into sealing engagement with the face 45 on the stator 32 to sealingly isolate the barrier gas from the product in the chamber 16. The presence of the pressurized barrier gas adjacent the front face 74, and adjacent the inner diameter of the seal face 34, results in the pressure adjacent the inner diameter of the seal face 34 being greater than the product pressure which exists at the outer diameter of the seal face 34. If any leakage occurs between the seal faces 33 and 34, then such leakage will be leakage of the barrier gas radially outwardly between the seal faces, which barrier gas will mix with the product in the chamber 16. In this fashion, the escape of product exteriorly of the seal assembly can be effectively prevented with a high degree of efficiency, and the escape of harmful product emissions externally of the seal can be effectively prevented to a very high degree.

At the same time, the outer seal assembly 18 maintains a seal between the barrier gas within the chamber 72 and the surrounding environment both so as to maintain the pressurized barrier gas between the two seal assemblies, and to function as a reductant seal to prevent escape of product into the environment in the event of a significant failure of the inner seal assembly 17.

During operation of the seal arrangement, the pressurized barrier gas within the chamber 72 also flows into the straight angled grooves 76 and 77 formed in the face of the rotor 51. Depending upon the direction of rotation of the rotor 51, one set of grooves 76 or 77 is effective in pumping the barrier gas radially inwardly of the grooves into the annular groove 79, thereby creating a hydrostatic pressure between the contacting seal faces 53 and 54, which hydrostatic pressure totally surrounds the annular contact dam 82 so as to control the contact pressure between the seal faces and at the same time control leakage such that any leakage across the dam will be the escape of inert barrier gas into the surrounding environment. At the same time, the flow of gas into and through the grooves 76, 77 and 79 is effective for cooling the seal faces by extracting heat therefrom due to flow of cooler gas through the grooves, with wear particles also being moved into and flushed out of the grooves by the flowing barrier gas. Due to the bi-rotational effect created by the reversely angled grooves 76 and 77, one of the groove sets 76 or 77 is effective for pumping barrier gas into the annular grooves 79 irrespective of the direction of rotation, and the other groove set effectively acts as a discharge of barrier gas from the groove 79 so as to permit continuous circulation of barrier gas through one angled groove set 76 or 77 into the annular groove 79 with discharge therefrom occurring through the other angled groove set 76 or 77.

The flow of barrier gas through the grooves also results in cooling of the intermediate face pads 83 due to their being effectively totally surrounded by the barrier gas, whereby the face pads are believed to develop a slight lift effect due to thermal waviness so as to further reduce the unit pressure or loading across the seal faces, particularly on the seal dam 82, to thereby further reduce wear while at the same time maintaining an effective seal.

With the improved dual seal arrangement 10 of the present invention, as briefly summarized above, it has been experimentally observed that this arrangement may provide improved performance conditions relative to prior known dual seals of this generally type, including improved (i.e. reduced) wear and reduced face pressure, accompanied by reduced leakage across the seal faces. At the same time, the improved dual seal arrangement is able to accommodate and utilize barrier gas pressures up to about 200 psi, and the overall seal can still operate at conventional elevated temperatures and high rotational speeds. The grooves 76 and 77 are formed with straight parallel sides which angle relative to the radial direction as the sides project radially inwardly, which straight grooves have been experimentally observed to provide improved performance in comparison to radial or circular grooves.

Figure 4:
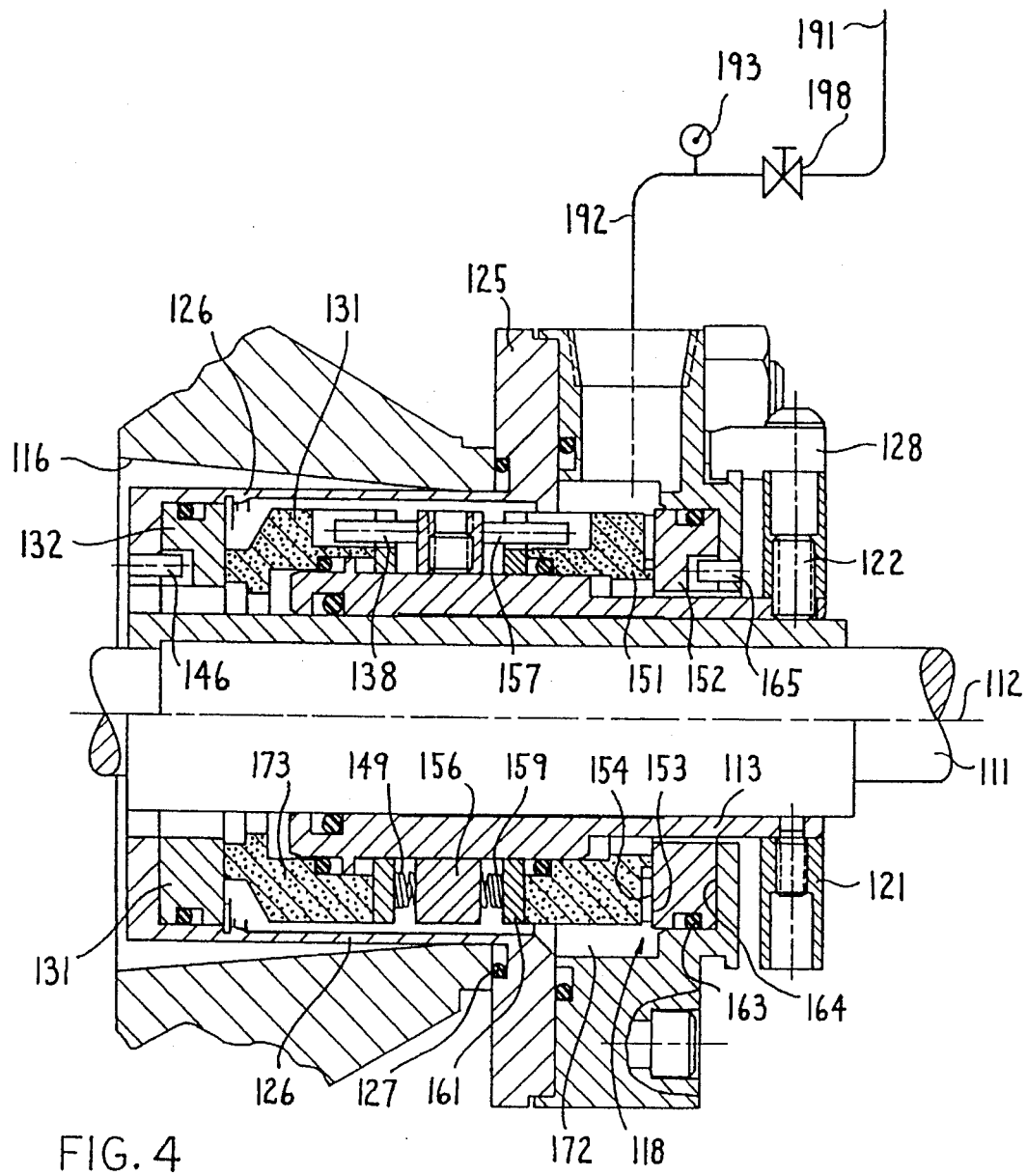
FIG. 4 is a central sectional view similar to FIG. 1 but illustrating another embodiment of the invention.

Reference is now made to FIG. 4 wherein there is illustrated an alternate embodiment of a gas barrier type dual seal arrangement according to the present invention. The dual seal arrangement of FIG. 4 is in significant respects both structurally and functionally similar to the embodiment of FIG. 1. Corresponding parts of the FIG. 4 embodiment have been designated by the same reference numerals as used in the FIG. 1 embodiment except for the addition of "100" thereto.

In this FIG. 4 variation, the annular hub 126 on the gland plate 125 has been axially elongated inwardly of the stuffing box chamber 116 so as to permit reversal in the axial orientation of the rotor 131 and stator 132. That is, in this embodiment, the stator 132 is positioned inboard of the rotor 131, rather than outboard thereof as in the FIG. 1 embodiment. This permits the rotors 131 and 151 to be disposed on axially opposite sides of a common collar 156, whereby the collar has the drive pins 138 and 157 fixed thereto and projecting outwardly in opposite directions so as to nonrotatably couple the respective rotors 131 and 151 to the shaft.

In all other respects the structure and operation of the dual seal arrangement 110 of FIG. 4 substantially corresponds to the arrangement 10 of FIG. 1, whereby further detailed description of the structure and operation thereof is believed unnecessary.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a gas barrier type double seal arrangement for sealing cooperation between a rotatable shaft and a housing to prevent leakage of product from an equipment chamber into the environment, said seal arrangement including an inner seal assembly coacting between the shaft and housing for preventing leakage of product into an intermediate chamber defined within the housing generally adjacent and partially surrounding the inner seal assembly, an outer seal assembly disposed axially outwardly of the inner seal assembly and coacting between the housing and shaft for preventing leakage from the intermediate chamber into the environment, each seal assembly including stator and rotor rings which are respectively nonrotatably secured to the housing and shaft in substantially concentric relationship relative to the shaft, the stator and rotor rings of each seal assembly having opposed axially-oriented contacting annular seal faces disposed in relatively rotatable sliding and sealing engagement with one another, and an inlet in communication with the intermediate chamber for supplying a pressurized inert barrier gas into said chamber, the improvement wherein the annular seal face on the rotor ring of said outer seal assembly has a deep groove arrangement therein in communication with the barrier gas of said intermediate chamber for effecting cooling of and minimizing contact pressure between the opposed seal faces of said outer seal assembly, said groove arrangement including a plurality of first straight grooves formed in the respective seal face in substantially uniformly angularly spaced relation therearound, a plurality of second straight grooves formed in the respective seal face in substantially angularly spaced relation therearound, said second grooves being individually positioned between an angularly adjacent pair of first grooves, said first grooves being individually positioned between an angularly adjacent pair of second grooves, said first and second grooves having radially outer ends which communicate with an outer diameter of the respective seal face, each of said first and second grooves projecting radially inwardly of the respective seal face from the respective outer end and having a longitudinally extending centerline which intersects at said outer end with a respective radial direction of said respective seal face so as to define an acute entrance angle therebetween, said first grooves being angled relative to the respective radial direction in one direction circumferentially around the respective seal face, said second grooves being angled relative to the respective radial direction in an opposite direction to said one direction circumferentially around the respective seal face, at least circumferentially adjacent said first and second grooves having radially inner ends which are in communication with one another to define a flow path for said barrier gas when said rotor ring is rotating, one of said circumferentially adjacent first and second grooves defining an upstream portion of said flow path and the other of said circumferentially adjacent first and second grooves defining a downstream portion of said flow path, and said first and second grooves having a depth of at least about 0.04 inch to create a hydrostatic force therein which reduces the contact pressure between the opposed contacting seal faces due to the presence of said barrier gas in said grooves.

2. A seal arrangement according to claim 1, wherein said grooves have a depth in the range of about 0.04 inch to about 0.08 inch.

3. A seal arrangement according to claim 1, wherein the acute entrance angle between the groove centerline and the respective radial direction is in the range of about 30° to about 60°.

4. A seal arrangement according to claim 1, wherein the groove arrangement includes an annular groove concentrically formed in the respective seal face and maintained in continuous communication with the radially inner ends of all of said first and second straight grooves, said annular groove being positioned radially outwardly of the inner diameter of the respective seal face to define a flat nongrooved annular dam face therebetween.

5. A seal arrangement according to claim 4, wherein the straight and annular grooves are all of the same depth.

6. A seal arrangement according to claim 4, wherein the straight grooves have a cross sectional area which is significantly greater than the cross sectional area of the annular groove.

7. A seal arrangement according to claim 4, wherein the straight and annular grooves have a depth in the range of about 0.050 to about 0.075 inch, wherein the annular groove has a width in the range of about 0.050 to about 0.075 inch, and wherein the first and second straight grooves have a width at least equal to the width of the annular groove.

8. A seal arrangement according to claim 4, wherein the dam face has a radial width of about 15% to about 20% of the radial width of the respective seal face.

9. A seal arrangement according to claim 4, wherein the acute entrance angle between the groove centerline and the respective radial direction is in the range of about 30° to about 60°.

10. A seal arrangement according to claim 9, wherein said grooves have a depth in the range of about 0.04 inch to about 0.08 inch.

11. A mechanical seal assembly disposed within a housing chamber in substantially concentric and surrounding relationship to a rotatable shaft positioned within the chamber for creating a seal therebetween, comprising:

a barrier gas chamber disposed between said housing and said seal assembly for containing therein an inert pressurized barrier gas;

said seal assembly including stator and rotor rings which are respectively nonrotatably secured to the housing and shaft in substantially concentric relation to the shaft, the stator and rotor rings having opposed axially-oriented annular seal faces disposed in relatively rotatable sliding and sealing engagement with one another at an annular contact area;

the rotor ring seal face including a deep groove arrangement therein in communication with the barrier gas of said intermediate chamber for effecting cooling of and reducing contact pressure between the opposed seal faces of said outer seal assembly;

said groove arrangement including a plurality of first straight grooves formed in the respective seal face in substantially uniformly angularly spaced relation therearound, and a plurality of second straight grooves formed in the respective seal face in substantially angularly spaced relation therearound, said second grooves being individually positioned between an angularly adjacent pair of first grooves, said first grooves being individually positioned between an angularly adjacent pair of second grooves, said first and second grooves having radially outer ends which communicate with an outer diameter of the respective seal face, each of said first and second grooves projecting radially inwardly of the respective seal face from the respective outer end and having a longitudinally extending centerline which intersects at said outer end with a respective radial direction of said respective seal face so as to define an acute entrance angle therebetween, said first grooves being angled relative to the respective radial direction in one direction circumferentially around the respective seal face, said second grooves being angled relative to the respective radial direction in an opposite direction to said one direction circumferentially around the respective seal face, and at least circumferentially adjacent said first and second grooves having radially inner ends which are in communication with one another to define a flow path for said harrier gas when said rotor ring is rotating, one of said circumferentially adjacent first and second grooves defining an upstream portion of said flow path and the other of said circumferentially adjacent first and second grooves defining a downstream portion of said flow path, and said first and second grooves having a depth of at least about 0.04 inch to create a hydrostatic force therein which reduces the contact pressure between the opposed contacting seal faces.

12. A seal arrangement according to claim 11, wherein said grooves have a depth in the range of about 0.04 inch to about 0.08 inch.

13. A seal arrangement according to claim 11, wherein the acute entrance angle between the groove centerline and the respective radial direction is in the range of about 30° to about 60°.

14. A seal arrangement according to claim 11, wherein the groove arrangement includes an annular groove concentrically formed in the respective seal face and maintained in continuous communication with the radially inner ends of all of said first and second straight grooves, said annular groove being positioned radially outwardly of the inner diameter of the respective seal face to define a flat nongrooved annular dam face therebetween.

15. A seal arrangement according to claim 14, wherein the straight and annular grooves have a depth in the range of about 0.050 to about 0.075 inch, wherein the annular groove has a width in the range of about 0.050 to about 0.075 inch, and wherein the first and second straight grooves have a width at least equal to the width of the annular groove.

16. A seal arrangement according to claim 14, wherein the dam face has a radial width of about 15% to about 20% of the radial width of the respective seal face.

17. A seal arrangement according to claim 14, wherein the acute entrance angle between the groove centerline and the respective radial direction is in the range of about 30° to about 60°.

18. A seal arrangement according to claim 14, wherein said grooves have a depth in the range of about 0.04 inch to about 0.08 inch.

19. A seal arrangement according to claim 14, wherein the dam face has a radial with of no more than about 25% of the radial width of the annular contact area, wherein the acute entrance angle between the groove centerline and the respective radial direction is in the range of about 30° to about 60°, and wherein said grooves have a depth in the range of about 0.04 inch to about 0.08 inch.

* * * * *